June 15, 1965          H. WALKER          3,189,361
CHUCK
Filed May 8, 1963          3 Sheets-Sheet 2
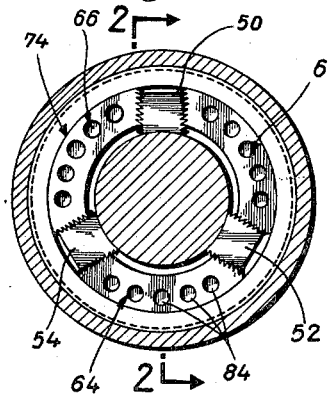
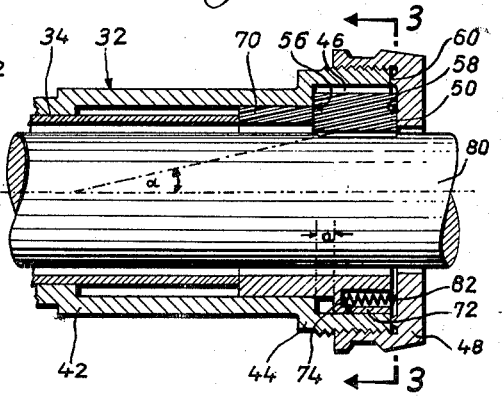
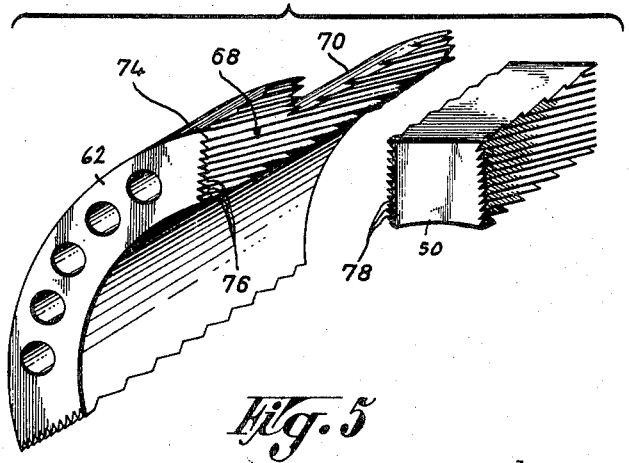
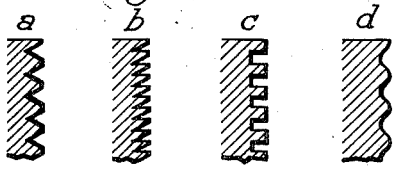
Inventor:
Hermann Walker
BY Michael S. Striker
ATTORNEY

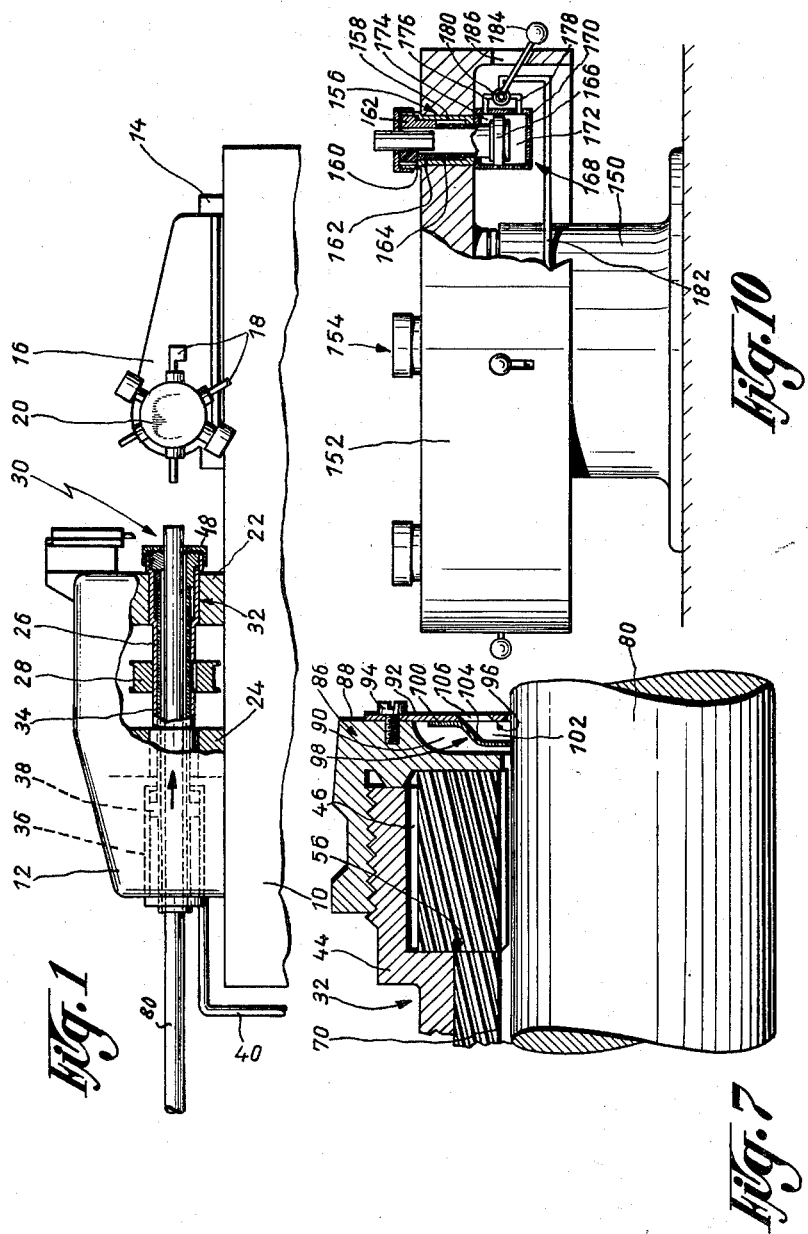

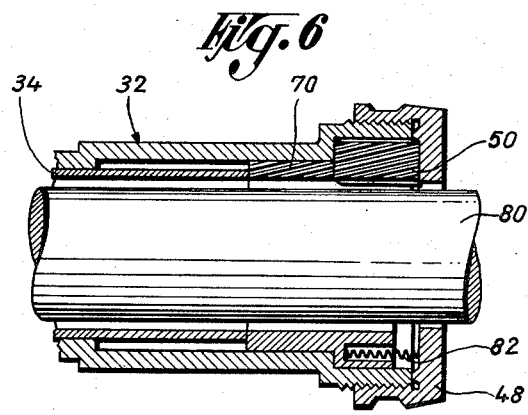
Fig. 6
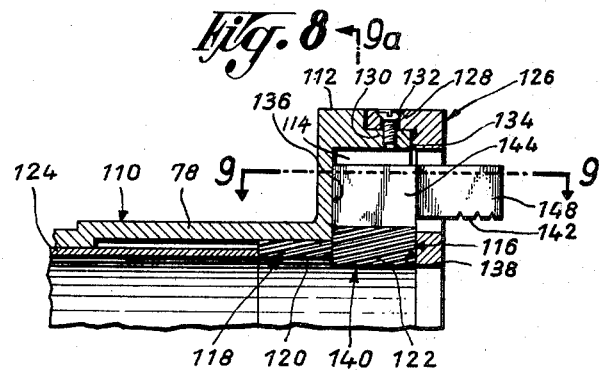
Fig. 8
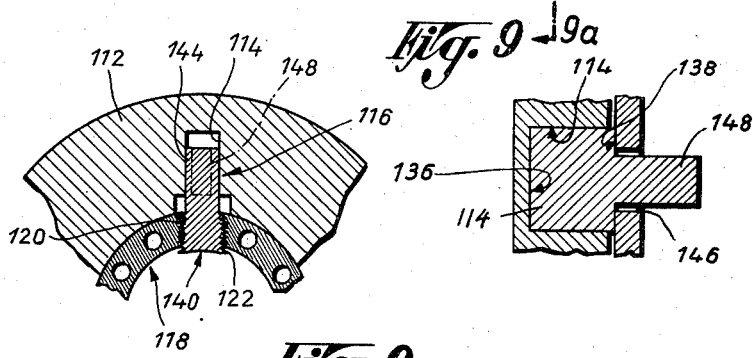
Fig. 9
Fig. 9a
Inventor:
Hermann Walker
BY Michael S. Striker
ATTORNEY 3,189,361
CHUCK
Hermann Walker, Esslingen-Waldenbronn, Germany, assignor to Index-Werke K.G. Hahn & Tessky, Esslingen (Neckar), Germany
Filed May 8, 1963, Ser. No. 278,830
Claims priority, application Germany, May 11, 1962, J 21,755
10 Claims. (Cl. 279—4)

The present invention relates to a chuck and more particularly to a chuck or collet for clamping workpieces fed through the headstock of a machine tool.

It is known to clamp objects, such as workpieces or tools, in universal chucks which have a plurality of radially movable clamping jaws. Chucks of this type, which can be used for clamping a workpiece in centric or eccentric position, are comparatively heavy and therefore not suitable for automatic machine tools. Particularly, universal chucks in which the clamping jaws are simultaneously moved by a spiral shaped thread, are expensive to manufacture, and operate too slow for use in automatic machine tools.

The chucks which are widely used in automatic machine tools are made of a single slotted tubular piece into which the workpiece or tool is inserted, whereupon tongues separated by the slots are simultaneously pressed together to engage the workpiece. Automatic chucks of this type take up little space as compared with the chucks in which three clamping jaws are used, and can be consequently built into hollow drive spindles of machine tools. Automatic chucks of this type have the disadvantage that they must be made of a single tubular element, and that parts of the chuck have to be hardened so that there is a great deal of waste in manufacture. Another disadvantage of this construction is that each chuck is suitable only for a very small range of diameters of the workpieces and tools clamped thereby, so that an entire set of different chucks having different clamping ranges must be provided for each automatic machine tool.

Another disadvantage of this construction resides in the accumulation of chips in and between the clamping jaws, which prevent an accurate centric clamping of the workpiece. When the chuck is placed in the clamping position, chips between the clamping jaws are even more tightly clamped rendering a removal very difficult.

It is the object of the present invention to provide a chuck or collet of simple construction which can be inexpensively manufactured and easily operated, but which has a great range as far as the diameters of clamped objects fed therethrough are concerned.

Another object of the present invention is to provide a chuck including a plurality of angularly spaced clamping means which can be simultaneously shifted in radial directions by operating means which do not include a spiral thread.

Another object of the present invention is to provide a chuck including a plurality of angularly spaced clamping means which can be moved in radial direction by an operating member moving in axial direction.

Another object of the present invention is to provide a chuck having a great range of clamped diameters, but which can be built into a hollow drive shaft of an automatic machine tool.

Another object of the present invention is to provide a chuck built into the hollow drive shaft of a machine tool, and being constructed to permit the passage and feeding forward of a rod-shaped blank through the hollow drive shaft and through the chuck when the clamping means of the chuck are moved to a position releasing the blank.

Another object of the prsent invention is to provide a chuck whose clamping members can be exchanged for other clamping members more suitable for a particular machining operation.

Another object of the present invention is to provide a chuck with means which prevent the entering of chips between the clamping jaws.

With these objects in view, the present invention relates to a chuck for clamping workpieces and tools. One embodiment of the invention comprises a drive shaft having a tubular casing part, preferably closed by a cap; a plurality of clamping means angularly spaced about the axis of the casing part and being mounted on the same for movement in radial direction; control means located between the clamping means and mounted on the casing part for relative movement in axial direction and hollow operating means for the control means located in the drive shaft and permitting feeding of the workpiece.

Each clamping means has first guide means, preferably a plurality of ridges and grooves slanted to the axial and radial directions and engaging corresponding second guide means on the control means so that relative axial movement between the control means, and the supporting means with the clamping means, will cause radial movement of the clamping means for clamping and releasing an object. In the preferred embodiment of the invention, three clamping means are mounted between a pair of axially spaced abutment faces of the casing so as to be non-movable in axial direction, but movable in radial direction.

Three corresponding control means are respectively located between the clamping means abutting the same with the respectively slanted guide means so that the clamping means and control means form together an annular assembly. The control means have portions located within a cylindrical inner surface of the casing and slidably engaging the same so that they are movable only in axial direction, but cannot move in radial direction when transmitting force to the clamping means.

The slanted ridges and grooves and the adjacent faces of clamping and control means are preferably inclined to the axis an angle of approximately 15° so that a comparatively short axial movement of the control means will result in substantial radial displacement of the clamping means, corresponding to a great range of objects of different diameters which may be clamped between the clamping means.

Only the clamping means have to be hardened, so that no difficulties are encountered as in prior art devices where the hardened portions cannot be separated from the entire chuck.

While a single ridge on each control means, for example, cooperating with a corresponding slanted groove on a clamping means would be sufficient to effect the desired radial movement, it is preferred to have a plurality of slanted parallel ridges and grooves on each control means and clamping means, since this permits the assembly of the control means and clamping means in different relative positions in which workpieces falling within different ranges of diameters can be clamped. For example, if all ridges of the control means engage all grooves of the corresponding clamping means, the clamping means will be able to clamp workpieces within a certain range of diameters. When the clamping means are set relative to the control means in such a manner that only the lower ridges of the clamping means engage the outer grooves of the control means, the minimum and maximum of the range will be increased since all clamping means will be located farther outside than in the previously described position.

Preferably, all control means are simultaneously moved in axial direction by an operating member, such as a tube within the hollow drive spindle and surrounding the rod-shaped workpiece blank. Such an operating member may be positively coupled to the control means, but if the automatic machine tool is provided with an operating member which can be moved only in one direction by a motor, the control means are provided with return springs which act to return the control means in opposite direction when the pressure of the operating member ceases. Coil springs located in corresponding blind bores of the control means are advantageously used for this purpose.

In one embodiment of the invention, the clamping means include, in addition to the clamping faces located within the drive spindle, also clamping jaws projecting from the casing and adapted to clamp workpieces of greater diameter.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 1 is a fragmentary side view, partially in section illustrating an automatic lathe provided with a chuck according to the present invention for holding a rod-shaped workpiece;

FIG. 2 is a longitudinal sectional view illustrating one embodiment of the invention on an enlarged scale;

FIG. 3 is a cross sectional view taken on line 3—3 in FIG. 2;

FIG. 4 is a fragmentary perspective and exploded view illustrating clamping means and control means of the embodiment of FIG. 2;

FIG. 5 includes four fragmentary cross sectional views illustrating modified constructions of a detail;

FIG. 6 is a longitudinal sectional view corresponding to FIG. 2 but illustrating another operational position of the chuck in which the workpiece is released;

FIG. 7 is a fragmentary sectional view on an enlarged scale illustrating a modified detail of the embodiment of FIG. 2;

FIG. 8 is a fragmentary longitudinal sectional view illustrating another embodiment of the invention;

FIG. 9 is a fragmentary sectional iew taken on line 9—9 in FIG. 8, in an enlarged scale, FIG. 9a is a fragmentary sectional view taken on line 9a—9a in FIG. 8, and FIG. 10 is a side elevation, partially in section and illustrating a turntable supporting a plurality of chucks in accordance with the present invention.

Referring now to the drawings, and more particularly to FIG. 1, an automatic lathe comprises a machine bed 10 on which a head stock 12 is mounted. A slide 14 is longitudinally movable along machine bed 10 and supports a turret 20 for turning movement about a horizontal axis. Turret 20 is controlled by a conventional means, not shown, to turn between a plurality of positions in which different tools, such as drills, are located opposite, and coaxial with a rod-shaped workpiece W which passes through headstock 12 and more particularly through a hollow tubular drive shaft 26 which is mounted in headstock 12 for rotation about bearings 24 and 22. The axis of rotation of drive shaft 26 coincides with the axis of the workpiece and of the operative tool 18. Drive shaft 26 is driven by a pulley 28 which is connected by a suitable belt to a drive motor, not shown.

The chuck 30 according to the present invention, and the operating means therefor, are mounted within the hollow drive shaft 26. Drive shaft 26 has for this purpose a tubular portion 32 of greater diameter closed by an annular cap 48 as best seen in FIGS. 2 and 6. A tube 34 constitutes an operating member for the chuck, and is mounted within drive shaft 26 for movement in axial direction. The operating means for the chuck 30 further includes a cylinder 36 and a reciprocable piston 38 which is rigidly connected with the left end of the operating tube member 34 so that when pressure fluid is supplied through pipe 40 to cylinder 36, the tubular operating member 34 is moved toward the right as viewed in FIG. I to cause a clamping operation of chuck 30.

Drive shaft portion 32, and cap 48 constitute casing means for the chuck, and it will be understood that the chuck may be enclosed in corresponding casing means which are not part of a drive shaft. Such a construction will be hereinafter described with reference to FIG. 10.

As best seen in FIGS. 2 and 6, the casing has a tubular main portion 42 and a portion 44 of greater diameter which is located outside the head stock, and as best seen in FIG. 1. An annular chamber 46 is formed by casing portion 44, and is closed by an annular cap 48 having an inner thread engaging a corresponding outer thread on the outer surface of portion 44. Cap 48 has abutment means 60 abutting the annular end face of portion 44 so that abutment surfaces 56 and 58 are accurately spaced from each other. Surfaces 56 and 58 are located in planes perpendicular to the axis of the device. At least two clamping means are located in the annular chamber 46, and in the illustrated embodiment three clamping means or clamping members 50, 52, 54 are arranged in chamber 46 spaced equal angles of 120° from each other. Since the end faces of clamping members 50, 52, 54 slidably engage the radial abutment faces 56 and 58, the clamping members are non-movable in axial direction, but movable in radial direction which is possible due to the fact that the radius of the annular inner surface of chamber 46 is greater than the radius of the outermost points of the clamping members. The inner clamping position of the clamping members is illustrated in FIG. 2, while the position in which the workpiece 80 is released is illustrated in FIG. 6 where the outer faces of the clamping members are shown to be directly adjacent the inner cylindrical surface of chamber 46.

In the embodiment of FIGS. 2 and 3, three control means or members 62, 64, 66 are located in the spaces between clamping members 50, 52, 54, and form an annular assembly with the same. Consequently, the control members 62, 64, 66 assure the uniform spacing of clamping members 50, 52, 54. Each clamping means has radial faces abutting adjacent radial faces of a control means. The radial faces of the clamping means and control means are provided wtih first and second guide means 68, which are best seen in FIG. 4. The guide means of the control means are shown to be parallel ridges and grooves 76 slanted to the axial and radial directions, and the guide means of the clamping means are shown to be parallel ridges and grooves 78 slanted at the same small angle which is preferably an angle of 15°, as indicated by the angle α in FIG. 2. Ridges and grooves 76, 78 engage each other so that axial movement of the control means 62, 64, 66 will cause radial movement of the clamping means 50, 52, 54.

Each control means includes a portion 74 of greater diameter located between adjacent clamping means, and a guide portion 70 located within the tubular wall 42 of casing 32 and guided in the same for axial movement. Since the outer diameter of the guide portions 70 corresponds to the diameter of the cylindrical inner surface of wall 42, the control members 62, 64, 66 are prevented from radial movement, but can be simultaneously shifted in axial direction, and more particularly can be shifted to the right as viewed in FIG. 2 when the tubular operating member 34 is shifted to the right by the hydraulic motor 36, 38. The position of the first and second guide means 76 and 78 is selected so that movement of the control means to the right will cause inward movement of the clamping means, and thereby clamping of a workpiece 80 located between the clamping means.

The axial distance between the radial abutment faces 56 and 58 is selected to be greater than the axial extension of portion 74 of the control members. The difference is indicated at a in FIG. 2, and is selected so that axial shifting of the control members for the distance $a$ will be sufficient to move the clamping members in radial direction between the releasing position shown in FIG. 6 and the clamping position shown in FIGS. 2 and 3.

The guide ridges and grooves 76 and 78 may have different cross sections, as illustrated in FIG. 5. A plain zig-zag shape is shown in FIG. 5a, a saw-tooth shape in FIG. 5b, a rectangular shape in FIG. 5c, and a wavy shape in FIG. 5d.

Since in the illustrated embodiment both radial faces of each control member, and of each clamping member are provided with the guide ridges and grooves, shifting of the control members will cause movement of the clamping members in radial direction without any tilting or jamming of the clamping members. The clamping force of the clamping members will be determined by the angle at which the ridges or grooves are slanted, and an angle up to 15° or somewhat higher, has been found suitable for this purpose. Evidently, the distance of radial movement of the clamping members is a function of the distance of axial movement of the control members, depending on the angle of the slanted guide means 76 and 78.

Each control member is formed with a plurality of blind bores or recesses 84 in which coil springs 82 are mounted. The ends of coil springs 82 abut the inner surface 58 of the cap 48, so that the springs exert a pressure on the control members urging the same to move to the left as viewed in FIG. 2.

Assuming that the hydraulic piston 38 exerts no pressure on the tubular operating member 34, springs 82 will urge all control members and operating member 34 to the left as viewed in FIG. 6 so that the clamping members are moved to the outer position in which clamping member 50 is shown in FIG. 6. In this outer position, workpiece 80 is released.

When pressure fluid is admitted into cylinder 36, piston 38 is moved to the right and urges the operating member 34 to the right to shift all control members 62, 64, 66 simultaneously to the right so that the clamping members 50, 52, 54 are inwardly moved to the clamping position in which clamping member 50 is illustrated in FIG. 2.

As soon as the hydraulic pressure is relieved, springs 82 are operative to push the control members to the left, causing movement of the clamping members in outward direction and release of the workpiece. The movement of the control members is terminated when the shoulders of the control members between portions 74 and 70 abut abutment face 56.

It will be noted that the clamping and releasing operations require only small radial movements of the clamping members, and that the inner position of the clamping members depends entirely on the diameter of the workpiece. In order to assure rapid operation, the radial distance of movement of the clamping members between clamping position and releasing position should be small. Therefore, it is not possible to clamp workpieces of substantially different diameter in one position of the clamping members. If the device is to be adapted to a workpiece of a smaller diameter, cap 48 is opened and removed, and control members 62, 64, 66 and clamping members 50, 52, 54 are assembled in a different position in which the clamping members are placed farther inward so that only the radially outer parts of the grooves and ridges 78 of the clamping members engage only the radially inner parts of the grooves and ridges 76 of the control members. When cap 48 is again closed, the inner clamping faces of the clamping members will be located farther inward than as shown in FIG. 2. Axial shifting of the control members will transmit radial forces to the clamping member, as described before, although only fewer ridges and gooves 76, 78 cooperate to shift the clamping members.

In this manner, the device can be set and adjusted for workpieces of different diameters, while the actual distance travelled by the clamping members between releasing and clamping position will remain the same, irrespective of the diameter of the workpiece. Therefore, the advantage of slotted automatic chucks which very rapidly release and clamp is maintained, while the device is nevertheless settable to diameters of different workpieces which is the advantage of a universal chuck using a spiral groove.

In the illustrated embodiment, a plurality of parallel ridges and grooves 76 and 78 is provided on the control members and clamping members. However, it is sufficient to provide each clamping member, or each control member with a single ridge, and to provide the corresponding other members with a plurality of parallel grooves. In order to vary the basic diameter for which the clamping means are operative, it is only necessary to set the single ridge into an inner groove, or into an outer groove of the respective other member. Assuming that ten grooves are provided, and that the radial distance between each clamping position and releasing position is four times the clamping range of a slotted automatic chuck, a chuck according to the present invention replaces forty conventional slotted automatic chucks considerably reducing expenses and facilitating storage.

While in the illustrated embodiment, the slanted guide means are provided on both radial faces of each clamping member and control member, it is sufficient to provide only one radial face of each control member and the adjacent face of the adjacent clamping member with slanted guide means. If only two clamping members spaced 180° are provided, a single control member having slanted guide means on opposite radial faces and engaging corresponding slanted guide means on adjacent faces of the two clamping members is necessary. In order to assure proper position of the clamping members, a corresponding spacing part can be provided which has the same arcurate shape as the control member, and slidably engages smooth radial faces of the clamping members. The diametrical position of the two clamping members in this embodiment could also be assured by radially extending guide parts of the casing. In all constructions in which only one radial face is provided with slanted guide means, the respective other radial face is made smooth to be able to slide on the corresponding spacing member, or on a corresponding smooth face of a control member.

In the embodiment of FIG. 2, the outer faces of the clamping members are spaced from the inner cylindrical surface of chamber 46, so that the clamping members can be set farther outwards, if clamping of a workpiece of greater diameter is desired. In this event, only the outer part of the slanted guide means 76 will engage only the inner parts of the slanted guide means 78. In order to permit such an adjustment, the annular wall 44 has a greater radius than the annular wall 42, and as best seen in FIG. 1, wall 44, cap 48, and chamber 46 are located outside of the head stock. The diameter of the drive shaft 26 would not be sufficient to house the radially adjustable clamping means.

When during operations on the workpiece 80 in the position shown in FIG. 1, chips accumulate in the region of cap 48, such chips may enter through the central bore in cap 48, and interfere with the clamping and control members which may be prevented from assuming their clamping and releasing positions. The modification illustrated in FIG. 7 overcomes this disadvantage. On the casing portion 32, which may be a portion of the tubular drive shaft of increased diameter, a threaded annular cap 86 is mounted in threaded engagement with an outer thread on the annular wall 44. The end face of cap 86 is formed with the cavity 90 which communicates with a central opening through which workpiece 80 passes. A closure plate 92 covers cavity 90 and is secured by screws 94 to cap 86. The closure plate is formed with outlet openings 106. A guiding means for chips in the form of a dished deflector plate 104 is secured at its outer rim 100 to the cover plate 92, for example by spot welding.

During a cutting operation, chips will enter along the workpiece 80 through the central opening in cover plate 92 into the chamber 102 formed between deflector plate 104 and the inner surface 96 of the closure plate 92. The chips will accumulate in chamber 102 and gradually flow outwardly to be deflected by deflector plate 104 to pass out of chamber 102 through the outlet openings 106. While the central opening in cover plate 92 forms a substantial annular gap with workpiece 80 through which chips can enter, the central opening in deflector plate 104 slides on workpiece 80, or is very closely spaced therefrom, so that the chips cannot pass along the workpiece beyond the deflector plate 104, but are urged by the same to move outwardly and out of openings 106.

However, even if the chips deflecting device shown in FIG. 7 is not provided, and chips enter into chamber 46 where the clamping members and control members are mounted, the slanted guide ridges and guide grooves of the control members and clamping members will be automatically cleaned whenever the control members are moved to the right in the drawing.

FIG. 8 illustrates a modified construction of the present invention in which the clamping members are constructed to be suitable also for clamping workpieces whose diameter is so great that they can no longer pass through the hollow drive shaft of the headstock.

A casing 110 with a tubular part 78 of smaller diameter, and an annular part 112 of greater diameter is closed by cap 126 which is secured to casing part 112 by screws 132. Projections 134 exactly determine the position of cap 126. Casting part 112 has radially extending guideways bounded by abutment faces 136 and 138, of which the latter is provided on the cap 126, and radial guide faces 114, as best seen in FIG. 9. Clamping members 116 have guide portions 144 which are guided in radial direction along guide faces 114, 136, and 138. Due the radial guiding of the clamping members 116, it is not necessary to form a complete assembly of control members 118 and clamping members 116. Clamping members 116 have radial faces provided with slanted ridges and grooves 122 interengaging with corresponding slanted ridges and grooves 120 on control members 118 which are shiftable in axial direction, and are controlled by tubular operating member 124, as described with reference to the embodiment of FIGS. 2 and 6. When the operating member 124 is shifted to the right, the clamping members are urged inwardly to engage with their inner clamping faces 140 a workpiece passing through the tubular operating member 124, and the central opening in cap 126.

The guide portions 144 carry axially projecting clamping jaws 148 which pass through corresponding slots 146 in the radial plate of cap 126. Clamping jaws 148 have clamping faces 142 which are located radially outwardly of the clamping faces 140. Therefore, it is possible to clamp a workpiece of larger diameter between the clamping faces 142 of the clamping jaws 148 of clamping means 116. Springs, not shown, and corresponding to springs 82 are provided for urging the control members 118 to the left when the release of the clamping jaws is desired.

FIGS. 1 and 2 illustrate an embodiment in which the hollow tubular drive shaft of a headstock is provided with a casing portion of greater diameter for housing the chuck of the present invention. FIG. 10 illustrates an arrangement in which a plurality of chuck devices according to the present invention are mounted on a turntable 152 which is turnable about a vertical axis provided on a base 150. A plurality of workpieces can thus be clamped in the chucks of the present invention, and successively placed in operative position, for example aligned with a vertical drill.

Each chuck device 154 has a casing 156 with a tubular part 158 mounted in the plate of table 152. The wider casing part 160 projects above the upper surface of table 152. An operating tube member 164 is axially slidable in tubular casing portion 158, and is connected to a piston 166 movable in a chamber 172 of a cylinder member 170. Clamping members and control members are provided in the casing as explained with reference to FIGS. 2 and 6, so that movement of piston 166 will cause clamping of the workpiece, or release of the same. The tubular operating member 164 is positively secured to the control members 162, so that the same are moved in opposite directions by piston 166. An operating fluid is supplied though a conduit 182 to a valve 180 communicating through conduits 178 and 176 with chambers 172 and 174 in cylinder 170. A handle lever 184 controls valve 180, and is movable in a slot or cutout 186 of the turntable.

By operation of handle 184, pressure fluid can be supplied to one or the other chamber of cylinder 170 to move the piston 166 and thereby the control members 162 in axial direction for clamping or releasing the workpiece between the clamping members.

It will be understood that each of the elements described above or two or more together, may also find a useful application in other types of chucks differing from the types described above.

While the invention has been illustrated and described as embodied in a universal chuck settable to automatically clamp workpieces of different diameters, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a machine tool, in combination, a support; a hollow drive shaft mounted in said support for rotation about an axis and having at one end a casing means having a central opening in the region of said axis; a plurality of clamping means angularly spaced about said axis and guided in said casing means for movement in radial direction and non-movable in axial direction, each clamping means having first guide means; at least one control means located between said clamping means and mounted in said casing means for movement in axial direction and non-movable in radial direction, said control means having second guide means engaging said fiirst guide means, and at least one guide means of engaging pairs of first and second guide means being slanted relative to said axis; and substantially hollow operating means guided in said hollow drive shaft for axial movement and operatively connected with said control means for moving said control means in axial direction to cause radial movement of said clamping means for clamping and releasing an elongated workpiece fed through the interior of said tubular operating means and having an end projecting out of said central opening.

2. In a machine tool, in combination, a support; a hollow drive shaft mounted in said support for rotation about an axis and having at one end a casing means having a central opening in the region of said axis; a plurality of clamping members located in said casing means angularly spaced about said axis, non-movable in axial direction, and movable in radial direction, each clamping member having first guide means; a plurality of angularly spaced control members respectively located between said clamping members and mounted in said supporting casing means movable in axial direction and non-movable in radial direction, each control member abutting the clamping members between which the respective control member is located so that said control members and said clamping members form an annular assembly, each control member having second guide means engaging a first guide means, and at least one guide means of engaged pairs of first and second guide means being slanted relative to said axis and to a radial direction; and substantially tubular operating means guided in said hollow drive shaft for axial movement and operatively connected to said control members for moving the same in axial direction to cause radial movement of said clamping members for clamping and releasing an elongated workpiece fed through the interior of said tubular operating means and having an end projecting out of said central opening.

3. In a machine tool, in combination, a support; a hollow drive shaft mounted in said support for rotation about an axis and having at one end a casing means having a central opening in the region of said axis; a plurality of clamping means angularly spaced about said axis and guided in said casing means for movement in radial direction and non-movable in axial direction, each clamping means having first guide means including a plurality of parallel guide ridges and grooves extending at the selected small angle slanted to said axis and to a radial direction; at least one control means located between said clamping means and mounted in said casing means for movement in axial direction and non-movable in radial direction, said control means having second guide means, each second guide means including a plurality of parallel guide ridges and grooves extending at said selected small angle slanted to said axis and to a radial direction, said ridges and grooves of adjacent pairs of first and second guide means engaging each other; and substantially tubular operating means guided in said hollow drive shaft for axial movement and operatively connected with said control means for moving said control means in axial direction to cause radial movement of said clamping means for clamping and releasing an elongated workpiece fed through the interior of said tubular operating means and having an end projecting out of said central opening.

4. In a machine tool, in combination, a support; a hollow drive shaft mounted in said support for rotation about about an axis and having at one end a casing means, said casing means including a pair of annular walls extending perpendicularly to said axis and having a pair of confronting axially spaced abutment faces, the wall located closer to the end of said drive shaft having a central opening in the region of said axis; a plurality of clamping members located in said casing means angularly spaced about said axis and slidably engaging said abutment faces so as to be non-movable in axial direction, and movable in radial direction, each clamping member having first guide means; a plurality of angularly spaced control members respectively located between said clamping members and mounted in said supporting casing means movable in axial direction and non-movable in radial direction, each control member abutting the clamping members between which the respective control member is located so that said control members and said clamping members form an annular assembly, each control member having second giude means engaging a first guide means, and at least one guide means of engaging pairs of first and second guide means being slanted relative to said axis and to a radial direction; and substantially tubular operating means guided in said hollow drive shaft for axial movement and operatively connected to said control members for moving the same in axial direction to cause radial movement of said clamping members for clamping and releasing an elongated workpiece fed through the interior of said tubular operating means and having an end projecting out of said central opening.

5. In a machine tool, in combination, a support; a hollow drive shaft mounted in said support for rotation about an axis and having at one end a casing means, said casing means having a pair of axially spaced walls extending perpendicularly to said axis and having confronting axially spaced annular abutment faces, said casing means having between said abutment faces a cylindrical surface of greater diameter than the diameter of the inner surface of the adjacent portion of said drive shaft; a plurality of clamping members located in said casing means angularly spaced about said axis and slidably engaging said abutment faces so as to be non-movable in axial direction, and movable in radial direction, each clamping member having first guide means; a plurality of angularly spaced control members mounted in said casing means, each control member having a guide portion slidably guided on said inner surface of said adjacent portion of said drive shaft, and an actuating portion located between adjacent clamping members, said control members being movable in axial direction, and non-movable in radial direction, said actuating portions abutting the clamping members between which they are located so that said control members and clamping members form an annular assembly, each actuating portion having second guide means engaging an adjacent first guide means, and at least one guide means of engaging pairs of first and second guide means being slanted relative to said axis and to a radial direction so that relative axial movement between said control members and clamping members causes radial movement of said clamping members; and substantially tubular operating means guided in said hollow drive shaft for axial movement and operatively connected with said guide portions of said control members for moving said control members in axial direction to cause radial movement of said clamping means for clamping and releasing an elongated workpiece fed through the interior of said tubular operating means and between said guide portions of said control members and having an end projecting out of said casing means.

6. The combination set forth in claim 5 wherein said casing means includes a tubular portion integral with said drive shaft and having said inner surface of greater diameter, wherein one of said annular walls is integral with said drive shaft and said tubular wall and has one of said abutment faces, and a cap member threaded onto said tubular portion and including the other annular wall and the other abutment surface, said other annular wall having a central opening whose diameter is greater than the distance between the innermost parts of said clamping members.

7. In a machine tool, in combination, a support; a hollow drive shaft mounted in said support for rotation about an axis and having at one end a casing means having a central opening in the region of said axis; a plurality of clamping means angularly spaced about said axis and guided in said casing means for movement in radial direction and non-movable in axial direction, each clamping means having first guide means; at least one control means located between said clamping means and mounted in said casing means for movement in axial direction and non-movable in radial direction, said control means having second guide means engaging said first guide means, and at least one guide means of engaging pairs of first and second guide means being slanted relative to said axis; and operating means including a tubular operating member guided in said hollow drive shaft for axial movement and having one end operatively connected with said control means, and hydraulic motor means cooperating with the other end of the tubular operating member for moving the same and said control means in axial direction to cause radial movement of said clamping means for clamping and releasing an elongated workpiece fed through the interior of said tubular operating member and having an end projecting out of said central opening.

8. In a machine tool, in combination, a support; a hollow drive shaft mounted in said support for rotation about an axis and having at one end a casing means, said casing means having a pair of axially spaced walls extending perpendicularly to to said axis and having confronting axially spaced annular abutment faces, said casing means having between said abutment faces a cylindrical surface of greater diameter than the diameter of the inner surface of the adjacent portion of said drive shaft; a plurality of clamping members located in said casing means angularly spaced about said axis and slidably engaging said abutment faces so as to be non-movable in axial direction, and movable in radial direction, each clamping member having first guide means; a plurality of angularly spaced control members mounted in said casing means, each control member having a guide portion slidably guided on said inner surface of said adjacent portion of said drive shaft, and an actuating portion located between adjacent clamping members, said control members being movable in axial direction, and non-movable in radial direction, said actuating portions abutting the clamping members between which they are located so that said control members and clamping members form an annular assembly, each actuating portion having second guide means engaging an adjacent first guide means, and at least one guide means of engaging pairs of first and second guide means being slanted relative to said axis and to a radial direction so that relative axial movement between said control members and clamping members causes radial movement of said clamping members; and operating means including a tubular operating member guided in said hollow drive shaft for axial movement and having one end abutting said guide portions of said control members for moving the same in one axial direction to cause inward radial movement of said clamping members, and spring means abutting said actuating portions of said control members and one of said abutment faces of said casing means for urging said control members to move in the opposite axial direction to cause outward movement of said clamping members whereby said clamping members clamp and release an elongated workpiece fed through the interior of said tubular operating member and having one end projecting out of said casing means.

9. The combination set forth in claim 1 wherein said casing means has an end wall perpendicular to said axis, said end wall having said central opening and being formed with a cavity on the outside thereof, said casing means including a chip guiding means having a closure plate covering said cavity and having a central bore for the workpiece and outlet means for chips entering through said bore, said chip guiding means including a deflector plate located in said cavity for guiding chips out of said outlet means.

10. The combination set forth in claim 9 wherein said deflector plate is annular and dished and has a peripheral rim secured to said closure plate outwardly of said outward means.

References Cited by the Examiner
UNITED STATES PATENTS

| | | | |
|---|---|---|---|
| 976,452 | 11/10 | Garvin | 279—121 |
| 2,702,713 | 2/55 | Brenner | 279—74 |
| 2,711,904 | 6/55 | Gartner | 279—1 |
| 2,779,601 | 1/57 | Skillin | 279—4 |

ROBERT C. RIORDON, *Primary Examiner.*